United States Patent [19]

Raehse et al.

[11] Patent Number: 4,728,731
[45] Date of Patent: Mar. 1, 1988

[54] REACTOR AND ITS USE IN POLYSACCHARIDE ETHER PRODUCTION

[75] Inventors: Wilfried Raehse, Duesseldorf; Willi Wuest, Ratingen; Norbert Kuehne, Haan, all of Fed. Rep. of Germany

[73] Assignee: Henkel Kommanditgesellschaft auf Aktien, Duesseldorf, Fed. Rep. of Germany

[21] Appl. No.: 838,231

[22] Filed: Mar. 10, 1986

[51] Int. Cl.$^4$ .................. C08B 11/00; C08B 11/08
[52] U.S. Cl. .......................... 536/96; 536/98; 536/84; 366/307
[58] Field of Search .............. 536/96, 98, 84; 366/307

[56] References Cited

U.S. PATENT DOCUMENTS

| | | | |
|---|---|---|---|
| 19,610 | 3/1858 | Perry et al. | 366/307 |
| 25,453 | 9/1859 | Taylor | 366/307 |
| 26,109 | 11/1859 | Jebb | 366/307 |
| 271,242 | 1/1883 | Hobbs | 366/307 |
| 2,592,481 | 4/1952 | Spencer et al. | 366/307 |
| 4,017,671 | 4/1977 | Schminke et al. | 536/98 |
| 4,063,018 | 12/1977 | Ohmaka et al. | 536/98 |
| 4,310,663 | 1/1982 | Hilbig et al. | 536/96 |
| 4,507,474 | 3/1985 | Raehse et al. | 536/98 |

FOREIGN PATENT DOCUMENTS

| | | | |
|---|---|---|---|
| 602798 | 8/1960 | Canada | 366/307 |
| 1253726 | 11/1971 | United Kingdom | |
| 135877 | 1/1960 | U.S.S.R. | 366/307 |

OTHER PUBLICATIONS

Ullmanns Encyclopaedie der Technischen Chemie, 4, Auflage, Band 2, Verlag Chemie, Weinheim/Bergstr.

Primary Examiner—Ronald W. Griffin
Attorney, Agent, or Firm—Ernest G. Szoke; Henry E. Millson, Jr.; Mark A. Greenfield

[57] ABSTRACT

An improved reactor (and process using the same) comprising multistage stirrer elements and baffles, which has particular dimensional ratios between the reactor diameter, the width and spacing of the stirrer elements, and the baffles. The reactor is particularly adapted for the production of polysaccharide ethers, especially cellulose ethers.

16 Claims, 1 Drawing Figure

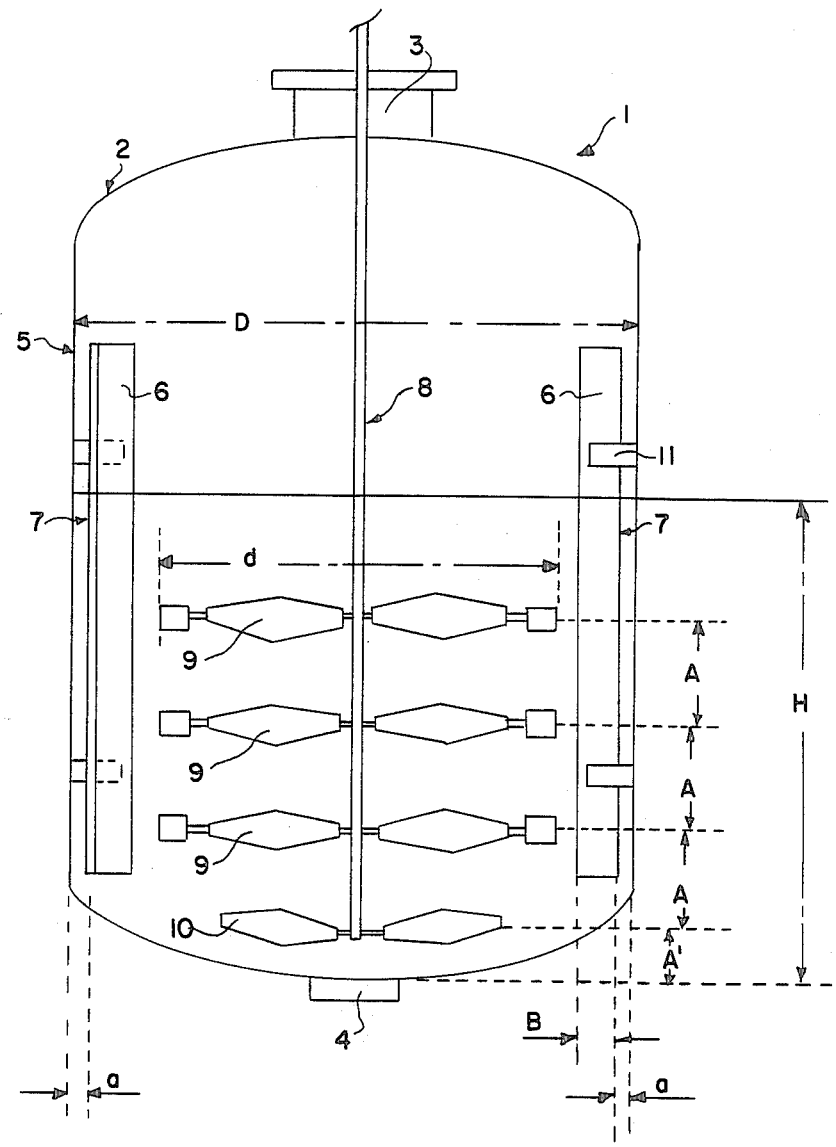

REACTOR AND ITS USE IN POLYSACCHARIDE ETHER PRODUCTION

BACKGROUND OF THE INVENTION

1. Field of the Invention

This invention relates to an improved reactor with multistage stirrer elements and baffles and its use in the production of polysaccharide ethers, particularly cellulose ethers.

2. Statement of the Related Art

It is known that polysaccharide ethers, more especially cellulose ethers, can be produced by a multiple-step-reaction in which each step comprises alkalizing and then etherifying a suspension of finely divided cellulose, as described in U.S. Pat. No. 4,507,474 (and corresponding German application No. 33 03 153). The reactions preferably take place in stirred reactors, such as mixer-reactors, stirrer-equipped autoclaves, cascades or even in columns or screw reactors.

Such reactors are available in many different configurations, and commonly a particular reactor construction is suitable only for a particular set of reactants. Thus, a different reactor may be chosen depending upon whether carboxymethyl, methyl, hydroxyethyl, hydroxypropyl cellulose ethers or mixed ethers thereof are to be produced and also depending on the starting materials which, besides cellulose, may comprise starches and guar and also mixtures thereof and which may be used in various forms from powders to about 2 mm long fibers.

In addition to the fact that the particular reactor selected can only be used for certain starting materials and products, another disadvantage is that, in every case, the reaction is accompanied by relatively high external energy consumption. Thus, according to U.S. Pat. No. 4,063,018 for example, the reaction is carried out under wet grinding conditions whereas, according to British Pat. No. 1,253,726 (and corresponding published German application No. 19 11 993), the starting materials are vigorously mixed, preferably by a combined tumbling and beating movement. Alternatively, the necessary energy may be applied by pump recirculation through homogenizers, for example as described in U.S. Pat. No. 4,017,671 (and corresponding published German application No. 24 00 879).

SUMMARY OF THE INVENTION

The present invention provides a reactor and process for the production of polysaccharide ethers, more especially cellulose ethers, which may be universally applied, irrespective of the starting materials used, and which has a minimal energy consumption despite thorough mixing and homogenization or suspension of the reactants.

The reactor of this invention is particularly adapted to perform the process described in U.S. Pat. No. 4,507,474, mentioned above, and this patent is therefore incorporated herein by reference.

Although some component elements of the inventive reactor are individually known, the inventive combination of these elements is not, particularly the critical dimensional ratios between certain of the elements, as described below. The improvement of using the inventive reactor for the production of polysaccharide ethers (particularly cellulose ethers) from cellulose suspended in organic solvents and alkyl halides and/or lower epoxides by alkalization and etherification with stirring is also not known.

The reactor comprises: a vertical, cylindrical, walled vessel of diameter D with a convexly curved top and bottom; a vertical, rotatable, axial shaft extending through the vessel from top to bottom, connected at one end to suitable drive means; a plurality of pairs of symetrically opposed stirrer elements radially extending from the shaft a total width d, which pairs are spaced an interval A from each other along the shaft, the lowest pair being spaced a shorter interval A′ from the bottom of the vessel; a plurality of baffles extending vertically along the inner cylindrical wall of the vessel, permitting the stirrer elements to rotate with adequate clearance, each baffle having an inner edge spaced a radial distance a from the inner cylindrical wall; at least one inlet means at the top of the vessel; at least one outlet means at the bottom of the vessel; and particular dimensional ratios between D, d, A, A′, a, and the height of the reaction mass being processed H, as described below.

BRIEF DESCRIPTION OF THE DRAWING

The FIGURE is a side cross-sectional view in which the baffles and stirrer elements all lie in the same plane.

DETAILED DESCRIPTION OF THE INVENTION

Other than where otherwise indicated, all numbers expressing quantities of elements, reaction conditions, or defining element parameters used herein are to be understood as modified in all instances by the term "about".

Within the vessel, the reactor comprises a multistage stirrer and baffles, the vertical distance A between two paired stirrer elements being 0.15 to 0.20 D (reactor inner diameter), preferably 0.17 to 0.19 D, most preferably 0.18 D, the vertical distance A′ between the lowest pair of stirrer elements and the inside bottom of the reactor being 0.07 to 0.09 D, preferably 0.08 D, the radial distance a between the baffle edge and the reactor wall being 0.035 to 0.05 D, preferably 0.035 to 0.037 D, the width of the baffles B being 0.045 to 0.085 D, preferably 0.05 to 0.08 D, the stirrer shaft extending to the bottom of the reactor and into the vicinity of the outlet opening and being equipped with paired stirrer elements adjacent the reactor bottom.

Studies of the production of polysaccharide ethers, more especially cellulose ethers, have suprisingly shown that, contrary to existing opinion, there is no need for a special input of energy or for the application of intense shear forces either during alkalization or during etherification. This is providing the reactants, (normally the suspended cellulose or alkali cellulose), are thoroughly mixed, in particular avoiding the formation of dead zones. Thorough mixing without the creation of dead zones is advantageously achieved without a high energy input, by the use of a reactor according to this invention. Compared with the stirrer-equiped autoclaves normally used, the reactor used in accordance with the invention has a smaller vertical distance between the stirrer elements, a greater radial distance between the baffles and the reactor wall, and a longer stirrer shaft with an extra stirrer element adjacent the bottom of the reactor.

That the dimensional ratios are critical and unexpected, and not merely the result of obvious experimentation, can be easily demonstrated by the several factors.

If, for example, the distance a between the longitudinal edge of the baffles adjacent the inner reactor wall and the inner reactor wall is less than 0.035 D, thorough mixing of the reactants without the creation of dead zones is no longer guaranteed despite the use of the reactor according to the invention. This is demonstrated by measurements of the cloud points, for example on 2% by weight aqueous solutions of carboxymethyl cellulose having an average degree of modification, using an apparatus of the Lange (Berlin) type in cuvettes with a layer thickness of 3.5 cm. With a radial distance a between the baffles and the inner reactor wall of <0.035 D, the cloud point undesireably rises to >50, whereas a distance of >0.035 D produces a cloud point of <10. Preferably, the distance a is not greater than 0.05 D.

According to the present invention, the ratio of the paired stirrer diameter d to the reactor diameter D is from 0.6 to 0.8, preferably 0.7. This also contributes to thorough mixing and homogenization or suspension of the reactants because, on the one hand, the size of the stirrer enables a large area of the reactor to be covered by the stirrer elements while, on the other hand, there is still enough space in which to accomodate the stirrers. If the stirrer elements have too large a diameter, there is no space left in which to accommodate baffles, producing a "carousel" effect in the suspension to be stirred which in turn results in poorer mixing and homogenization or suspension.

The peripheral speed of each stirrer element is advantageously from 4.5 to 7 meters per second (m/s). Whereas measurement of the cloud point at peripheral speeds in the above range produces values of <10, the cloud point increases to values of >30 at peripheral speeds below 4.5 m/s. Accordingly, this feature also contributes towards thorough mixing and homogenization or suspension of the cellulose. At high peripheral speeds of >7 m/s, the conditions deteriorate again, i.e. it is not possible to obtain homogeneous distribution in the reactor.

Finally, according to another aspect of the invention, stirring takes place with the horizontal axis of the uppermost stirrer element covered by the reaction mass to a height of from 0.1 to 0.33 D. The total height H of the reaction mass (i.e. "filling height") should be 0.80 to 0.88, preferably 0.84 D. This arrangement also contributes to thorough mixing during homogenization or suspension processes in the reactor used in accordance with the invention.

One embodiment of the invention is described in detail in the following with reference to the accompanying drawing.

The reactor 1 illustrated consists of a cylindrical or barrel-shaped or tank-like hollow vessel 2 with at least one inlet opening 3 and at least one outlet opening 4, and having top and bottom ends that bulge outward convexly. In its cylindrical wall 5, the size of the reactor is determined by the diameter D. In this cylindrical wall 5 of the reactor 1, vertical baffles 6 are arranged spaced from and parallel to the inner reactor wall in such a way that their longitudinal inner edges 7 adjacent the inner surface of the reactor cylindrical wall 5 are situated at a distance a therefrom. The baffles 6 are attached to an inner surface of the cylindrical wall 5 by means of braces 11. These braces 11 preferably position the baffles 6 at a 25° to 35° angle, preferably a 30° angle to a radial plane through the reactor central axis, most preferably inwardly deflected in the direction of stirrer rotation. In the cylindrical wall 5 illustrated in the drawing, two baffles 6 are arranged opposite one another inside the reactor. However, it would also be possible to fix three, four or even more baffles 6 peripherally on the inner surface of the cylindrical wall 5 in the reactor 1, preferably equally distanced from each other around cylindrical wall 5.

Concentric with its longitudinal central axis, the reactor 1 comprises a driven shaft 8 which, towards the lower end of the reactor, is provided with a stirrer consisting of four pair of individual stirrer elements 9, 10. Of the four paired stirrer elements 9, 10, the three upper paired stirrer elements 9 each have a diameter d and are in the known form of multistage impulse countercurrent stirrers (MIG), while the lower paired stirrer element 10 adjacent the bottom of the reactor, with a diameter smaller than d, is in the form of a trapezoidal propeller.

The paired stirrer elements 9, 10 are arranged vertically above one another at intervals A between their respective vertical axes and are covered by the liquid or mass to be homogenized or suspended, which fills the reactor to the height H, during the mixing or stirring process.

The shaft 8 may be rotated by any known drive means (not illustrated), for example an electric motor, during the mixing process so that, at the same time, the stirrer elements fixed to the shaft 8 are rotated and their peripheral speed is controlled.

The stirrer illustrated represents only one of many possible embodiments. Thus, the paired stirrer elements 9 and 10 may be in the form of interference multistage impulse countercurrent stirrer elements (IMIG) and, more particularly, the paired lower stirrer element 10 may have the same diameter d as the paired upper stirrer element 9, or may be somewhat smaller to conform to the vessel dimensions.

It is of course also possible to utilize more than four pairs of stirrer elements 9, 10 to form a stirrer, for example when the height H of liquid or mass to be mixed makes this seem appropriate. The FIGURE illustrates all stirrer element pairs 9, 10, lying in the same vertical plane. It is also possible for these pairs of elements to lie in different planes from one another, preferably evenly spaced about the shaft 8 central axis. In one particularly useful embodiment, alternate pairs of elements 9, 10, lie in planes intersecting at 90° angles along the vertical axis.

A description of a multistage impulse countercurrent stirrer (Mehrstufen-Impuls-Gegenstromruehrer-MIG) will be found in *Chem.-Ing.-Tech* 51:430–436 (1979) especially in table 1 on page 431, third item from the top. A further description will be found in *Ullman's Encyklopaedie der Technischen Chemie*, Verlag Chemie pub., Federal Republic Germany, 4th edition, volume 2, at Pp. 259–263, especially in illustration 3 item i and illustration 8 item f.

Heating means for the reaction mass may comprise any known means, such as heating coils wrapped around the exterior of the reactor cylinder wall 5. The particular heating means do not form a part of the invention and are not illustrated.

We claim:

1. In a process for the production of cellulose ethers from cellulose suspended in organic solvents and alkyl halides and/or lower epoxides by alkalization and etherification with stirring, the improvement of conducting said production in a reactor comprising: a vertical cylindrical walled vessel of a diameter D with a convexly curved top and bottom; a vertical, rotatable, axial shaft extending through said vessel; a plurality of pairs of symetrically opposed stirrer elements radially extending from said shaft a total width d, said pairs spaced an interval A from each other along said shaft, the lowest of said pairs being adjacent to and spaced a distance A' from the bottom of said vessel; a plurality of baffles extending vertically along the inner cylindrical wall of said vessel, permitting said stirrer elements to clear, each said baffle having a width B and an inner edge spaced a radial distance a from said inner cylindrical wall; inlet means at the top of said vessel and outlet means at the bottom of said vessel; the dimensional ratios between D, d, A and a being d=0.6 to 0.8 D,
A=0.15 to 0.20 D, and
a=0.035 to 0.05 D;

wherein reactants are charged through said inlet means until they fill said vessel to a height H which is 0.1 to 0.33 D above the uppermost pair of stirrer elements; said reactants are continuously stirred by rotation of said shaft and elements at a peripheral speed of 4.5 to 6.7 m.s. during the reaction; and the formed reaction product is discharged through said outlet means.

2. The process of claim 1 wherein further dimensional ratios of said vessel are:

A'=0.07 to 0.09 D; and
B=0.045 to 0.085 D;

so that said continuous stirring is conducted more effectively.

3. The process of claim 1 wherein said dimensional ratios are about:

d=0.7 D,
A=0.17 to 0.19 D, and
a=0.035 to 0.037 D.

4. The process of claim 3 wherein further dimensional ratios of said vessel are about:

A'=0.08 D; and
B=0.05 to 0.08 D;

so that said continuous stirring is conducted more effectively.

5. The process of claim 1 wherein said stirrer elements comprise at least three upper element pairs of the same width d and one lower element pair of a width less than d.

6. The process of claim 1 wherein said stirrer elements comprise three upper element pairs of the same width d and one lower element pair of a width less than d.

7. The process of claim 1 wherein there are two diametrically opposed said baffles.

8. The process of claim 1 wherein each said baffle is deflected inwardly in the direction of stirrer rotation at an angle of 25° to 35° to the radial.

9. The process of claim 1 wherein each said baffle is deflected inwardly in the direction of stirrer rotation at an angle of about 30° to the radial.

10. The process of claim 7 wherein each said baffle is deflected inwardly in the direction of stirrer rotation at an angle of about 30° to the radial.

11. The process of claim 1 wherein each said stirrer element is a multistage impulse countercurrent stirrer.

12. The process of claim 1 wherein each said stirrer element is an interference multistage impulse countercurrent stirrer.

13. The process of claim 6 wherein each said upper stirrer element is a multistage impulse countercurrent stirrer and each said lower element is a trapezoidal stirrer.

14. The process of claim 1 wherein said stirrer elements comprise three upper element pairs of the same width which is equal to 0.7 D and one lower element pair of a width less than d, each said upper stirrer element being a multistage impulse countercurrent stirrer and each said lower element being a trapezoidal stirrer.

15. The process of claim 1 used for the production of carboxymethylcellulose.

16. The process of claim 1 used for the production of hydroxyethylcellulose.

* * * * *